United States Patent [19]
Kelemen et al.

[11] 4,217,239
[45] Aug. 12, 1980

[54] COMPOSITION FOR SCINTILLATION COUNTING

[75] Inventors: Jozsef Kelemen, Basel, Switzerland; Eickhard Kühl, Rheinfelden-Eichsel, Fed. Rep. of Germany; Karl Schmid, Reinach, Switzerland

[73] Assignee: Ciba-Geigy Corporation, Ardsley, N.Y.

[21] Appl. No.: 11,271

[22] Filed: Feb. 12, 1979

[30] Foreign Application Priority Data

Feb. 22, 1978 [CH] Switzerland ............................ 1919/78
Dec. 28, 1978 [CH] Switzerland ........................ 13256/78

[51] Int. Cl.$^2$ ............................ G01T 1/20; F21K 2/00
[52] U.S. Cl. ................................................ 252/301.17
[58] Field of Search ...................................... 252/301.17

[56] References Cited

U.S. PATENT DOCUMENTS

| | | | |
|---|---|---|---|
| 3,457,180 | 7/1969 | Kretz et al. | 252/301.17 |
| 3,600,445 | 8/1971 | Wirth et al. | 252/301.17 X |

OTHER PUBLICATIONS

Gaugh et al., Research Disclosure No. 135, pp. 31-35, Pub. by Industrial Opportunities Ltd., Homewell, England, 7/75.

*Primary Examiner*—F. C. Edmundson
*Attorney, Agent, or Firm*—Michael W. Glynn; Edward McC. Roberts

[57] ABSTRACT

The invention discloses a composition for scintillation counting which contains a stabilizing compound and also the use thereof for liquid scintillation counting.

9 Claims, No Drawings

COMPOSITION FOR SCINTILLATION COUNTING

The present invention relates to a composition for scintillation counting which contains a stabilising organic compound of divalent sulfur and to the use of this composition for liquid scintillation counting.

It is known to the skilled person that scintillator counting samples must be stored for some time in the dark (equilibrated) before counting, as they tend to give an often substantially increased number of counts per minute (cpm) because of the action of light. This results in faulty measurements, which are all the more troublesome as they become clearly apparent only in the result of the blank test without tracer. It is not certain whether phosphorescence, chemoluminescence or other phenomena are involved. As the occurrence is evidently one that proceeds slowly, there results an unwanted delay between the preparation of the sample for counting and its trouble-free measurement.

To eliminate this disadvantage it has heretofore been necessary to prepare the scintillator composition in time and to keep it at constant and as low a temperature as possible (0° to 4° C.) with the exclusion of light. This adaptation time varied within wide limits, i.e. between at least 30 minutes and 24 hours.

According to the disclosure of German Offenlegungsschrift 2.022.309, the cheminoluminescence postulated therein can be reduced to an acceptable blank value, i.e. to one between 48 and 120 counts per minute, by treating the scintillator composition with specific basic compounds. However, the effect is only of very limited duration.

It has now been found that the light sensitivity can be reduced in an advantageous manner by adding organic compounds of divalent sulfur to the scintillator compositions. These additives make it possible to avoid a long adaptation time and to eliminate a possible source of error during the counting.

The compositions of the present invention for scintillation counting contain at least one such stabilising compound. Examples of the contemplated stabilising compounds are compounds of sulfur having a reducing action and their mixtures.

Preferred sulfur compounds are mercaptans whose dissociation constant is greater than that of phenol and also sulfides of the formula

$$R_1-S-R_2 \qquad (I)$$

wherein each of $R_1$ and $R_2$ independently represents an aliphatic radical of preferably 1 to 8, especially 1 to 4, carbon atoms, or $R_1$ and $R_2$ together with the sulfur atom to which they are attached also form a 5- or 6-membered ring.

The term "aliphatic" is to be understood as meaning acyclic, straight chain or branched, saturated or unsaturated hydrocarbon radicals of preferably 1 to 8, especially 1 to 4, carbon atoms, which are unsubstituted or substituted by non-chromophoric and non-ionogenic groups. Eligible non-chromophoric and non-ionogenic groups are in particular: hydroxyl, ammonium, mercapto and carboxyl groups and also the phenyl radical. Preferred aliphatic radicals are straight chain groups of 1 to 4 carbon atoms. Aliphatic radicals $R_1$ and $R_2$ can also contain other heteroatoms, for example oxygen or sulfur atoms. Heterocyclic rings which are formed by $R_1$ and $R_2$ together with the sulfur atom to which they are attached are preferably saturated rings which can contain further heteroatoms. Mercaptans are preferably aromatic and heterocyclic mercaptans, by which are meant for example compounds which, in addition to the mercapto group, can also contain other substituents at the aromatic or heterocyclic ring, such as alkyl radicals of 1 to 4 carbon atoms, amino groups, hydrazino groups, hydroxyl groups or a further mercapto group.

Representative examples of such mercaptans and sulfides are: 1-methyl-2-mercaptoimidazole, 2-mercaptobenzimidazole, 4-mercaptopyridine, 2-mercaptopyridine, 2-mercapto-4,6-dimethylpyrimidine, 2-mercapto-4-hydroxypyrimidine, pyridinethione-1-oxide, 2-mercaptobenzthiazole, 2-mercaptobenzoxazole, thiophenole, 2-mercapto-Δ 4-thiazoline, 2,5-dimercapto-1,3,4-thiadiazole, 3-mercapto-4-amino-5-hydrazino-4,1,2-triazole, thioanisole, dibutyl sulfide, 3,3-thiodipropionic acid, thiodiethylene glycol, 1,3-dithiane, diammonium sulfide, 3,3-thiodiproprionitrile, 2-mercaptoethylsulfide and tetrahydrothiophene.

The consequence of using the compounds contemplated in the present invention is that prior to counting, freshly prepared samples for scintillation counting can be equilibrated for much shorter times, or need not be equilibrated at all, until the blank value has stabilised at the minimum value. This advantage is clearly evident for example in a liquid scintillator which contains 4,4'-bis(2",5"-dimethylstyryl)-biphenyl as secondary solute and which indicates temporarily increased blank values even on moderate exposure to light without the addition of the eligible compounds of the invention. The effectiveness of the compounds employed in the present invention becomes clear when the samples for scintillation counting are subjected to extreme conditions by irradiation with an additional UV light source. Despite such extreme conditions, 15 minutes after exposure the blank value is smaller by at least a factor of 10 than that of a control sample without employing a compound according to the invention.

The compositions of the invention contain the stabilising compound is amounts up to 100% by weight, in particular 0.005 to 100% by weight and preferably 0.05 to 10% by weight, based on the scintillator active substance. Counting solutions contain 0.00005 to 1% by weight, preferably 0.0005 to 0.1% by weight, of stabiliser compound, based on the weight of these solutions.

The surprising feature of the use of these stabilisers is that the expected chemical quenching remains at a tolerable level.

Suitable scintillator substances for the compositions of the invention are both primary solutes and mixtures of primary and secondary solutes, for example the compounds known from Nucleonics 13, No. 12, December 155, pages 40 and 44, Journal Chem. Physic 50, No. 11, June 1969, page 4962 and German Offenlegungsschrift 2.022.309. It is also possible to use as scintillator substances 4,4'-bis-(2,5-dimethylstyryl)-biphenyl and 4,4'-bis-(2,4,5-trimethylstytryl)-biphenyl disclosed in U.S. Pat. No. 3,984,399.

The compositions of the invention are either ready-for-use liquid scintillators or solute concentrates which can be used for the preparation of liquid scintillator compositions for liquid scintillation counting.

Suitable solvents for liquid scintillation counting are in particular aromatic liquid hydrocarbons or hydrocarbon mixtures which are liquid at room temperature, for example benzene, toluene, ylenes, ethyl benzene, 1,3,5- triethylbenzene, cumene, cymenes, phenylcyclohexane, ethers such as anisole, dioxane, 1,2-dimethoxyethane, non-aromatic hydrocarbons, such as cyclohexane, heptane etc., or finally solvent mixtures, such as toluene/methanol and optionally water, toluene/ethanol, naphthalene/dioxane, naphthalene/toluene and optionally water, naphthalene/dioxane/water, methyl cellosolve/naphthalene/toluene and optionally water, naphthalene/tributylphosphate, other commercially available hydrocarbon mixtures recommended for these purposes or mixtures of aromatic hydrocarbons, for example those listed above, with surfactants, for example ethoxylated alkylphenols, ethoxylated fatty alcohols, polyoxyethylene alkylphenylsulfates, polycarboxylic ester sulfonates, alkylsulfonates, alkylsulfates, alkylnaphthalenesulfonates, alkylarylpolyglycol ethers, sulfated ethylene oxide adducts and fatty acid sulfates.

The concentration of the scintillator substances of the present invention can in principle vary within wide limits and is determined or limited for practical requirements. In the lower limit, for example, the concentration must be such that an adequate emission to the scintillator absorption system (photomultiplier) is ensured, while the upper limit is determined by a noticeable self-quenching. Although concentrations of 10% and higher are entirely possible for example for the preparation of stock solutions, the preferred concentrations in practice are between about 0.01 and 5%, especially between 0.1 and 3% and preferably between 0.4 and 2% (the percentages are by weight, based on the total weight of the solution).

Preferred solvent systems are toluene/methanol (1:1) with the addition of about 2% of water, methyl cellosolve/toluene/naphthalene (40:60:8) and up to 4% of water, dioxane/toluene/naphthalene (40:60:8) and up to 10% of water or toluene/methanol/ethanolamine (50:44:6) or the corresponding mixtures with the xylenes. The nature of the solvent system depends in particular on the nature of the substrate, i.e. isotope, to be measured, the most frequent representatives of the latter being for example $^{14}$C, $^{3}$H, $^{35}$S, $^{32}$P, $^{59}$Fe, $^{125}$I and $^{131}$I.

The following Examples illustrate the invention but imply no restriction to what is described therein. Percentages are by weight.

EXAMPLE 1

100 mg of 2-mercaptobenzthiazole are added as stabiliser to 100 ml of a ready-for-use solution of scintillator in toluene which contains, as primary solute, 800 mg of 2-(4'-tert-butylphenyl)-5-biphenylyl-1,3,4-oxadiazole (butyl-PBD) and, as secondary solute, 180 mg of 4,4'-bis-(2'',5''-dimethylstyryl)-biphenyl. 20 ml of this solution are irradiated for 15 minutes with a UV lamp (366 mµ). The measurement of the counts per minute which follows immediately yields a blank value which, in comparison with a sample which does not contain a stabiliser, is smaller by a factor of about $10^4$. After a 22 minute equilibration in the dark at 3° C., the non-stabilised sample still has a value which is greater by a factor of $10^3$ than the stabilised sample. Results on the same scale are obtained by using 3,3-thiodipropionic acid, 2-mercapto-1-methylimidazole or 2-mercaptobenzimidazole instead of 2-mercaptobenzthiazole.

EXAMPLE 2

Similarly good results are obtained by repeating the procedure described in Example 1, but using 1,4-bis-(2''-methylstyryl)-benzene as secondary solute.

EXAMPLE 3

Excellent stabilisation is also obtained by using a mixture of toluene and a surfactant, for example ethoxylated isooctylphenol (approx. 1:1) instead of toluene, for preparing the scintillator solution of Example 1.

EXAMPLE 4

Blank values which are smaller by factors of $10^2$ to $10^3$ than those of non-stabilised samples are obtained by repeating the procedure described in Example 1, but using thiodiethylene glycol, dibutyl sulfide, 1,3-dithiane, pyridine thione, thiophenol, 2-mercaptobenzoxazole, 2-mercaptothiazoline or tetrahydrothiophene as stabiliser instead of 2-mercaptobenzthiazole.

What is claimed is:

1. A composition for scintillation counting containing a scintillator active substance and an effective amount for reducing the light sensitivity of the scintillator active substance, of a stabilizer which is an organic compound of divalent sulfur or mixtures thereof, selected from the groups consisting of
   (a) aromatic or heterocyclic mercaptans, having a dissociation constant greater than that of phenol; and
   (b) sulfides of the formula $$R_1-S-R_2$$

wherein each of $R_1$ and $R_2$ independently represents an aliphatic radical of 1 to 8 carbon atoms, or $R_1$ and $R_2$ together with the sulfur atom to which they are attached, form a saturated aliphatic 5- or 6-membered ring.

2. A composition according to claim 1, wherein said stabilizer is present in an amount of 0.005 to 100% by weight, based on the amount of said scintillator active substance.

3. A composition according to claim 2, wherein said stabilizer is said aromatic or heterocyclic mercaptan.

4. A composition according to claim 2, wherein said stabilizer is said sulfide.

5. A composition according to claim 3, wherein said stabilizer is a 2-mercaptoazole.

6. A composition according to claim 5, wherein said stabilizer is a 2-mercaptobenzimidazole.

7. A composition according to claim 5, wherein said stabilizer is 1-methyl-2-mercapto-imidazole.

8. A composition according to claim 5, wherein said stabilizer is 2-mercapto-benzthiazole.

9. The use of the composition according to claim 1 for the preparation of a liquid sample for liquid scintillation counting.

* * * * *